(No Model.)
E. VON LANGE.
MEASURING APPARATUS.
No. 532,793. Patented Jan. 22, 1895.
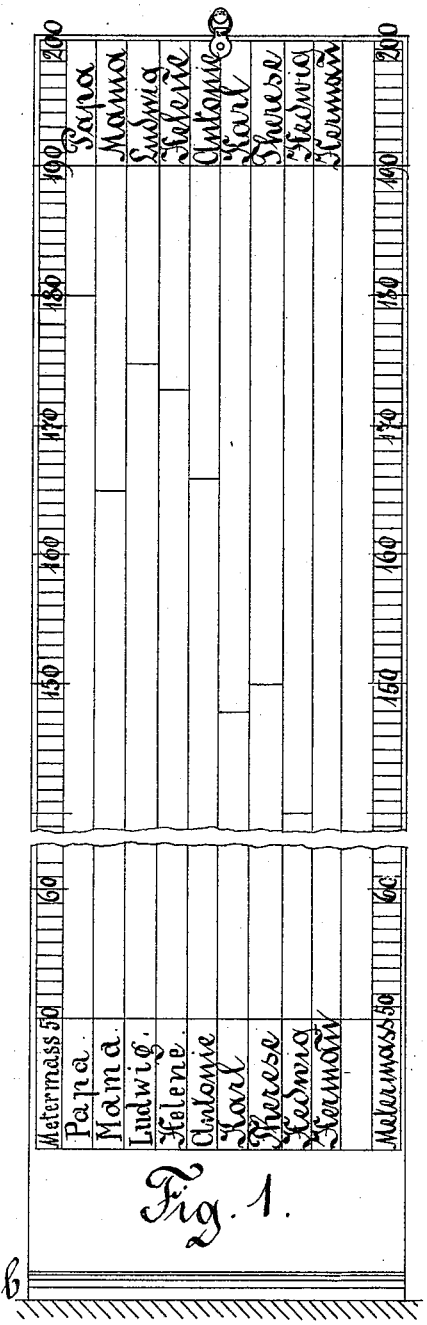
Fig. 1.
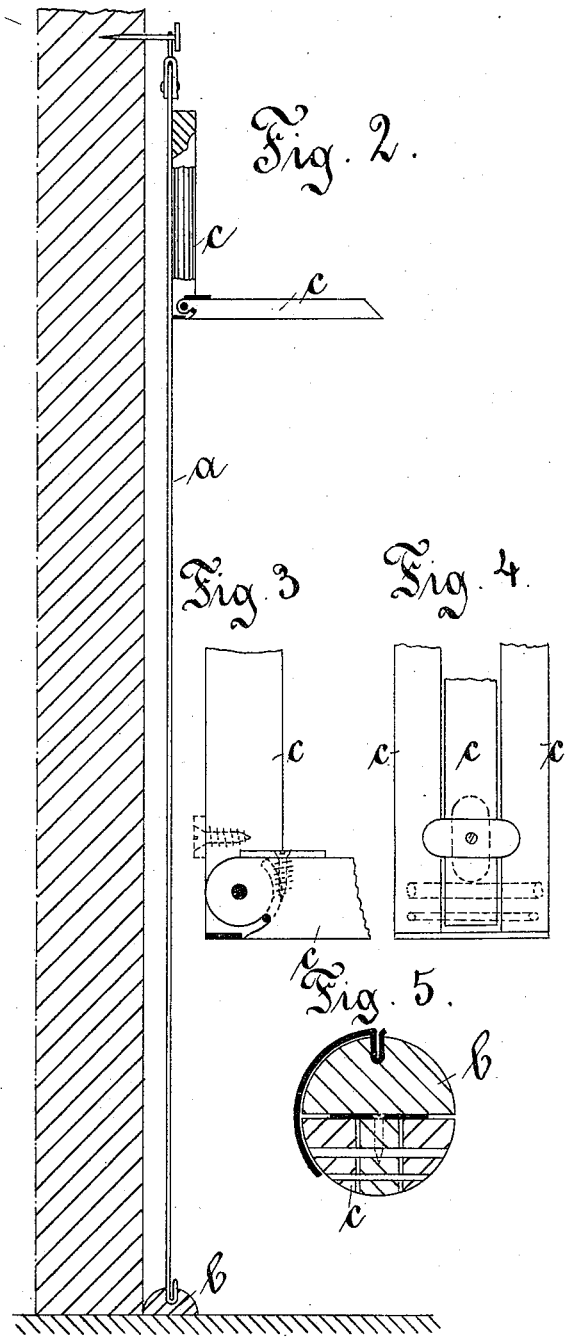
Fig. 2.
Fig. 3. Fig. 4.
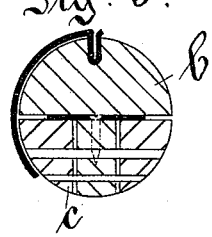
Fig. 5.
Witnesses:
A. J. Birney
F. H. Schott
Inventor:
Emil von Lange
by Max Fergü
Attorney

UNITED STATES PATENT OFFICE.

EMIL VON LANGE, OF MUNICH, GERMANY.

MEASURING APPARATUS.

SPECIFICATION forming part of Letters Patent No. 532,793, dated January 22, 1895.

Application filed September 7, 1894. Serial No. 522,391. (No model.)

*To all whom it may concern:*

Be it known that I, EMIL VON LANGE, a citizen of the Kingdom of Bavaria, and a resident of Munich, Germany, have invented certain new and useful Improvements in Measuring Apparatus, of which the following is a specification.

The object of the present measuring instrument is to fix or record the heights of persons named in a table, provided for the purpose, by marking their heights in meters, and also to show the growth of young persons by means of periodically taken measurements.

In the accompanying drawings—Figure 1 represents an elevation, Fig. 2, a longitudinal section of the device, and Figs. 3 and 4 details. Fig. 5 is a transverse section of the weighted bar and folded angle measure.

The metrograph consists of, first, a band strip, $a$, about two meters in height and thirty centimeters in breadth, made of paper or fabric, upon which is printed a metric scale diagram, as well as a series of columns in tabular form. To the foot of the band strip is attached, across its entire breadth, a weight, $b$, of wood or metal, in the form of a half-cylindrical bar, whose flat under surface is adapted to rest surely or firmly upon the floor, and, at the same time, to coincide with the zero point of the vertical metric scale extending above it. The top of the band strip is provided with a stiffening strip extending across it, as well as with a device (an eyelet or the like) for suitably fastening said band (or table) to a wall. Second, of a folding angle scale or measure, $c$, of wood or metal, provided with a device for securing both of its movable angle arms to a fixed angle of ninety degrees. This angle scale or measere can be of any suitable kind, as, for example, that shown in Figs. 3 and 4 of the drawings. In its closed position, the angle measure forms a half cylinder of a size similar to the weighted bar attached to the lower end of the band, so that both bars or pieces together form a complete cylinder, upon which the band can be smoothly and surely rolled up, (Fig. 5.) In this position, the rolled-up band (or table), together with the accompanying angle measure, can be housed in a protecting roll of pasteboard or tin.

In practice, the band is fastened to a smooth wall in such a manner that the flat under side of the weighted bar rests upon the floor. The person to be measured is then placed with his back to the table and the angle measure (opened at ninety degrees) is placed against the table from above and upon the cranium of the person to be measured and the corresponding height of the angle lever marked upon the table in the column corresponding to the person measured.

What I claim, and desire to secure by Letters Patent, is—

1. A measuring instrument for determining bodily measurements, consisting of a band strip, $a$, provided with a metric diagram and on its lower end with a weight adapted to be hung against a smooth wall, and also of a suitable folding angle measure, $c$, whereby the latter can, finally, in its closed position, form a half cylinder, which, together with the half-cylindrical weighted bar on the lower end of the band, forms a complete cylinder, thereby allowing the band to be suitably rolled up.

2. In a measuring instrument, the combination, with a strip of flexible material, of a semicylindrical weight secured to the end of the strip, and an angle measure having a semicylindrical cross section and arranged to be rolled up in the strip and forming a complete cylinder with the roll, substantially as set forth.

In testimony that I claim the foregoing as my invention I have signed my name in presence of two subscribing witnesses.

EMIL VON LANGE.

Witnesses:
 A. WEICKMANN,
 C. MAYER.